US009207745B2

(12) United States Patent
Nijhawan et al.

(10) Patent No.: US 9,207,745 B2
(45) Date of Patent: Dec. 8, 2015

(54) METHODS AND SYSTEMS FOR MANAGING PERFORMANCE AND POWER UTILIZATION OF A PROCESSOR EMPLOYING A FULLY-MULTITHREADED LOAD THRESHOLD

(71) Applicants: Vijay B. Nijhawan, Austin, TX (US); Gregory N. Darnell, Georgetown, TX (US); Wuxian Wu, Round Rock, TX (US)

(72) Inventors: Vijay B. Nijhawan, Austin, TX (US); Gregory N. Darnell, Georgetown, TX (US); Wuxian Wu, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/340,328

(22) Filed: Jul. 24, 2014

(65) Prior Publication Data

US 2014/0337644 A1    Nov. 13, 2014

Related U.S. Application Data

(63) Continuation of application No. 12/987,591, filed on Jan. 10, 2011, now Pat. No. 8,812,825.

(51) Int. Cl.
| | |
|---|---|
| G06F 1/32 | (2006.01) |
| G06F 11/30 | (2006.01) |
| G06F 11/34 | (2006.01) |
| G06F 11/00 | (2006.01) |
| G06F 9/48 | (2006.01) |

(52) U.S. Cl.
CPC .............. *G06F 1/3234* (2013.01); *G06F 1/324* (2013.01); *G06F 1/3206* (2013.01); *G06F 1/329* (2013.01); *G06F 9/4806* (2013.01); *G06F 11/00* (2013.01); *G06F 11/3017* (2013.01); *G06F 11/3409* (2013.01); *G06F 2201/81* (2013.01); *G06F 2201/86* (2013.01); *Y02B 60/1217* (2013.01); *Y02B 60/165* (2013.01)

(58) Field of Classification Search
None
See application file for complete search history.

(56) References Cited

U.S. PATENT DOCUMENTS

| | | |
|---|---|---|
| 3,736,569 A | 5/1973 | Bouricius et al. |
| 4,747,041 A | 5/1988 | Engel et al. |
| 5,304,846 A | 4/1994 | Azar |
| 5,414,860 A | 5/1995 | Canova, Jr. et al. |
| 5,560,022 A | 9/1996 | Dunstan et al. |
| 5,754,871 A | 5/1998 | Wilkinson et al. |

(Continued)

OTHER PUBLICATIONS

Charles, J. et al., Evaluation of the Intel Core i7 Turbo Boost feature, 2009, IEEE pp. 188-197, 2009.

*Primary Examiner* — Eric Coleman
(74) *Attorney, Agent, or Firm* — Baker Botts L.L.P.

(57) ABSTRACT

A method for managing performance and power utilization of a processor in an information handling system (IHS) employing a balanced fully-multithreaded load threshold is disclosed. The method includes providing a maximum current thread utilization (Umax) and a minimum current thread utilization (Umin) among all current thread utilizations of the processor and determining a current performance state (P state) of the processor. The method also includes increasing a current P state of the processor to a next P state of the processor towards a maximum P state (Pmax) of the processor when the current P state of the processor is between Umax and Umin and the current utilization rate of the processor is less than a first threshold utilization rate. The method further includes engaging the processor in a turbo mode when the current P state of the processor reaches the Pmax and the current utilization of the processor is greater than the first threshold utilization rate of the processor.

20 Claims, 6 Drawing Sheets

(56) References Cited

U.S. PATENT DOCUMENTS

| | | |
|---|---|---|
| 5,963,745 A | 10/1999 | Collins et al. |
| 5,991,792 A * | 11/1999 | Nageswaran ................. 718/102 |
| 6,311,287 B1 | 10/2001 | Dischler et al. ............... 713/601 |
| 7,043,650 B2 | 5/2006 | Bresniker et al. |
| 7,080,267 B2 | 7/2006 | Gary et al. |
| 7,254,721 B1 | 8/2007 | Tobias et al. .................. 713/300 |
| 7,584,475 B1 | 9/2009 | Lightstone et al. ............ 718/104 |
| 8,230,245 B2 | 7/2012 | Khatri et al. ................... 713/320 |
| 8,527,796 B2 | 9/2013 | Werner ......................... 713/322 |
| 2004/0006720 A1 | 1/2004 | Atkinson |
| 2004/0051708 A1 | 3/2004 | Hsu et al. |
| 2007/0016815 A1 | 1/2007 | Cooper et al. ................. 713/322 |
| 2007/0288728 A1 * | 12/2007 | Tene et al. ...................... 712/227 |
| 2008/0229127 A1 | 9/2008 | Felter et al. ................... 713/320 |
| 2009/0328055 A1 | 12/2009 | Bose et al. ..................... 718/105 |

* cited by examiner

METHODS AND SYSTEMS FOR MANAGING PERFORMANCE AND POWER UTILIZATION OF A PROCESSOR EMPLOYING A FULLY-MULTITHREADED LOAD THRESHOLD

CROSS-REFERENCE TO RELATED APPLICATION

The present application is a continuation application of copending U.S. patent application Ser. No. 12/987,591 filed Jan. 10, 2011, which is hereby incorporated by reference in its entirety for all purposes.

TECHNICAL FIELD

The present disclosure relates generally to the field of information handling systems, and, more specifically, to processor power state management methods and systems.

BACKGROUND

As the magnitude and use of information continues to increase, individuals and businesses seek additional ways to process and store information. One option available to users is an information handling system. An information handling system (IHS) generally processes, compiles, stores, and/or communicates information or data for business, personal, or other purposes thereby allowing users to take advantage of the magnitude of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In an information handling system (IHS), for example, a computer system using a general purpose, multi-core (e.g., on die Clip MultiProcessing (CMP)) processor and more specifically, a CMP processor and operating system using adaptive power management policies, the processor performance state (P state) adjusts based on demand. As the processor utilization for the IHS decreases, the processor may transition to a lower P state to conserve power. Alternatively, as the processor utilization increases, the processor may transition to a higher P state and may consume more power.

In existing operating systems, a target P state selection is based on the combination of processor utilization and the last selected P state. With a turbo mode (TM) capable processor, at the last selected P state, the processor frequency may increase to a highest frequency available when thermal constraints allow it.

Advanced Configuration and Power Interface (ACPI) is a power management system that allows a computer operating system (OS) to control the amount of power consumed by the processor and peripheral devices of the IHS. In existing ACPI processors which include P state information, each selectable core frequency is represented with corresponding control, status, and latency information. A replacement of the highest frequency of the last selected P state with a TM frequency may result in an increased usage of additional processing power when not needed. This may result in performance degrading caused by P state fluctuations due to unnecessary or early transitions to TM.

Conventional CPU power management algorithms allows the processor to engage in a TM in order to provide better processor performance when a current P state of the processor has reached the peak limit and a current utilization of the processor is also relatively high. The conventional CPU power management algorithm has been shown to be optimal in a majority of processor performance per watt evaluations. However, in many instances, such as in the case of a fully multithreaded processor workload, a drop in calculated performance per power ratio may occur when the processor engages in TM. Thus, a need may exist for methods and systems for improving the calculated processor power management system performance by specifying improved rules for the power management algorithm relating to the timing of the engagement of the TM and thereby enhancing the calculated power efficiency of the entire IHS. The enhanced calculated power efficiency for the IHS may be accomplished by achieving gains in the IHS's SPECPower score for a certain level of power consumption by saving power for a given SPECPower score, or both.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides for a method for managing performance and power utilization of a processor in an information handling system (IHS) employing a balanced fully-multithreaded load threshold. The method includes providing a maximum current thread utilization (Umax) and a minimum current thread utilization (Umin) among all current thread utilizations of the processor and determining a current performance state (P state) of the processor. The method also includes increasing a current P state of the processor to a next P state of the processor towards a maximum P state (Pmax) of the processor when the current P state of the processor is between Umax and Umin and the current utilization rate of the processor is less than a first threshold utilization rate. The method further includes engaging the processor in a turbo mode when the current P state of the processor reaches the Pmax and the current utilization of the processor is greater than the first threshold utilization rate of the processor.

Another aspect of the disclosure provides for a method for managing a processor when the processor executes a fully-multithreaded processor workload. The method includes determining a target P state of the processor for achieving an optimal target utilization of the processor and increasing a current P state of the processor to a next P state of the processor towards a maximum P state (Pmax) of the processor when a current utilization of the processor is less than a first threshold utilization of the processor. The method further includes engaging the processor in a turbo mode when the current P state of the processor reaches the Pmax and the current utilization of the processor is greater than a second threshold utilization of the processor.

Yet another aspect of the present disclosure provides an information handling system. The system includes a processor, one or more peripheral devices coupled to the processor, a basic input output system (BIOS) executable by the processor, and a power management module incorporated in the IHS wherein the power management module is an adjunct to the BIOS and provides power management functionality for the IHS. The power management functionality includes evaluating a current utilization of each thread of the processor, determining a maximum utilization (Umax) and a minimum utilization (Umin) of the current utilization of all threads of the processor, and increasing a current performance state (P state) of the processor to a next P state of the processor towards a maximum P state (Pmax) of the processor when a difference between the Umax and the Umin is less than a first threshold utilization of the thread of the processor and a current utilization of the processor is less than a second threshold utilization of the processor. The power management functionality includes engaging the processor in a turbo mode when the current P state of the processor reaches the Pmax of the processor and the current utilization of the processor is greater than a third threshold utilization of the processor.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Before the present systems and methods are described, it is to be understood that this disclosure is not limited to the particular systems and methods, as such may vary. Also, the present disclosure is not limited in its application to the details of construction, arrangement or order of components and/or steps set forth in the following description or illustrated in the figures. Thus, the disclosure is capable of other aspects, embodiments or implementations or being carried out/practiced in various other ways.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

One of ordinary skill in the art should further understand that the terminology used herein is for the purpose of describing possible aspects, embodiments and/or implementations only, and is not intended to limit the scope of the present disclosure which will be limited only by the appended claims. Further, use of terms such as "including", "comprising", "having", "containing", "involving", "consisting", and variations thereof are meant to encompass the listed thereafter and equivalents thereof as well as additional items.

It must also be noted that as used herein and in the appended claims, the singular forms "a," "and," and "the" may include plural referents unless the context clearly dictates otherwise. Thus, for example, reference to "a mode" refers to one or several modes and reference to "a method of regulating" includes reference to equivalent steps and methods known to those skilled in the art, and so forth.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
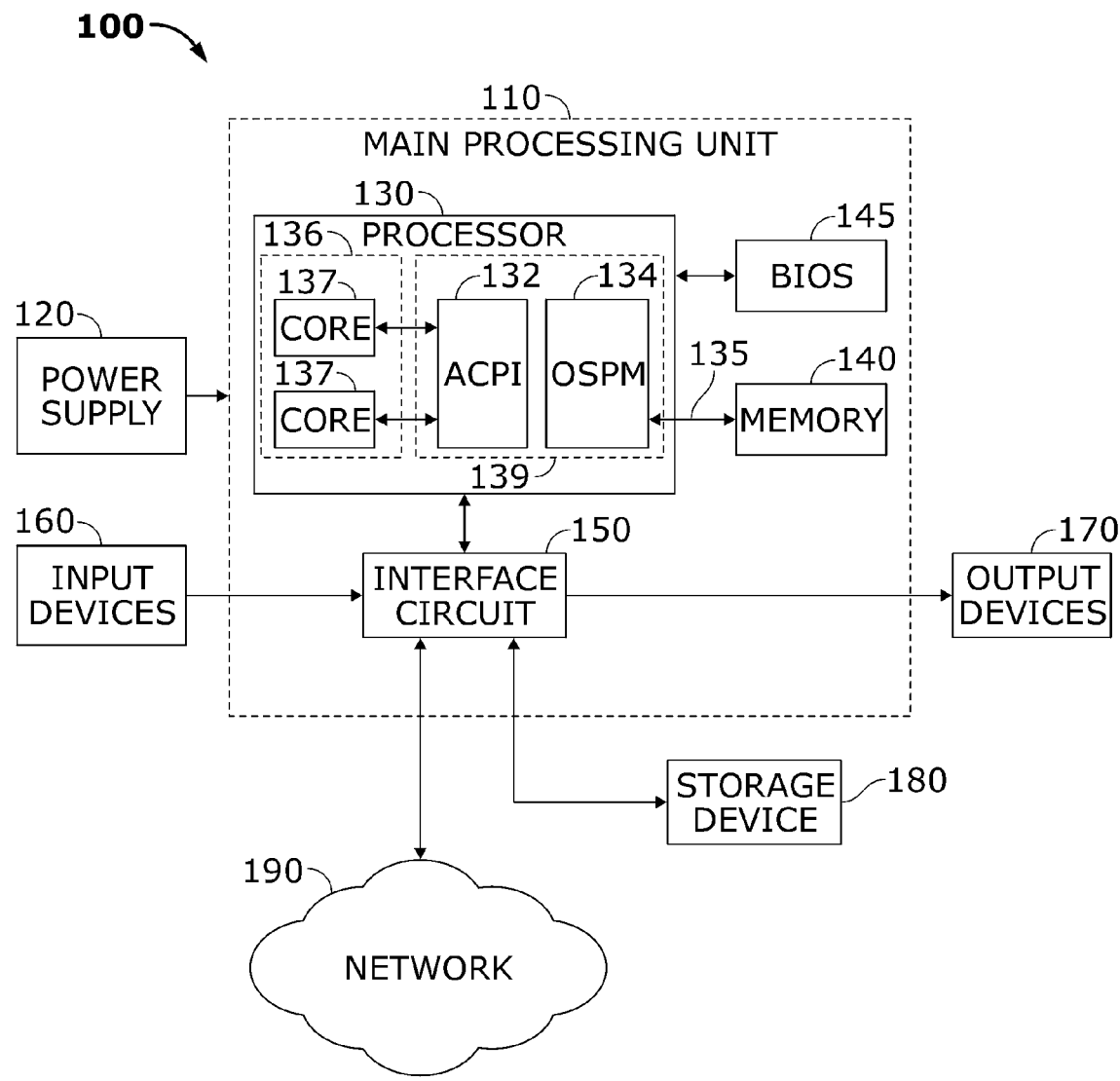
FIG. 1 represents an information handling system (IHS) in accordance with one aspect of the present disclosure.

According to exemplary embodiments of the present invention, FIG. 1 illustrates an IHS 100 which includes a main processing unit 110 powered by a power supply 120. According to implementations of the present disclosure, the main processing unit 110 may include a processor 130, such as a Turbo Mode (TM) capable processor, or example, electrically coupled by a system interconnect 135 to a memory device 140 and one or more interface circuits 150. For example, the system interconnect 135 may be an address/data bus, if desired. It should be understood that interconnects other than busses may be used to connect the processor 130 to the memory device 140. For example, one or more dedicated lines and/or a crossbar may be used to connect the processor 130 to the memory device 140.

According to some implementations of the present disclosure, the processor 130 may include a central processing unit (CPU) 136 which may include one or more cores 137. It should be understood that the terms "processor", "CPU", and "TM capable processor" may be used interchangeably within the present disclosure. The processor 130 may execute an operating system (OS), an advanced configuration and power interface (ACPI) 132 and an operating system power management (OSPM) application 134, if desired. In addition, the processor 130 may include a cache memory (not shown), such as, for example, static random access memory (SRAM) and the like, or any other type of internal integrated memory. The memory device 140 may include a dynamic random access memory (DRAM), a nonvolatile memory, or the like. In one example, the memory device 140 may store a software program which may be executed by the processor 130, if desired.

According to an implementation of the present disclosure, the IHS 100 may exchange data with other devices via a connection to a network 190. The network connection may include any type of network connection, such as an Ethernet connection, a digital subscriber line (DSL), a telephone line, a coaxial cable, etc. The network 190 may be any type of network, such as the Internet, a telephone network, a cable network, a wireless network such as, for example, a network complying IEEE standard 802.11, 1999 include one or more IEEE 802.11 related standards, IEEE 802.16 Standard for Wireless Metropolitan Area Networks and/or the like.

According to one implementation of the present disclosure, the processor 130 may operate in two or more operating frequencies. A selection of the operating frequency of the processor 130 may be done by the OSPM 134 based on the processor 130 load observed over a window of time, if desired. In turbo mode, the ACPI 132 may provide a target performance state (P state) to the OSPM 134. The OSPM 134 may set a power consumption target point and may modify the processor operating frequency and/or voltage according to the selected entry in a target P state. In some implementations of the present disclosure, the target P state related to the processor turbo mode may be provided by a basic input output system (BIOS) 145. Thus, turbo related P state may be related to the highest operating frequency of the processor in turbo mode.

The OSPM 134 logic may accurately select the appropriate P state needed to meet the performance needs of the IHS 100. It should be understood that the ACPI 132 and/or the OSPM 134 may be implemented by hardware, by software, and/or by any combination of hardware and/or software.

Figure 2:
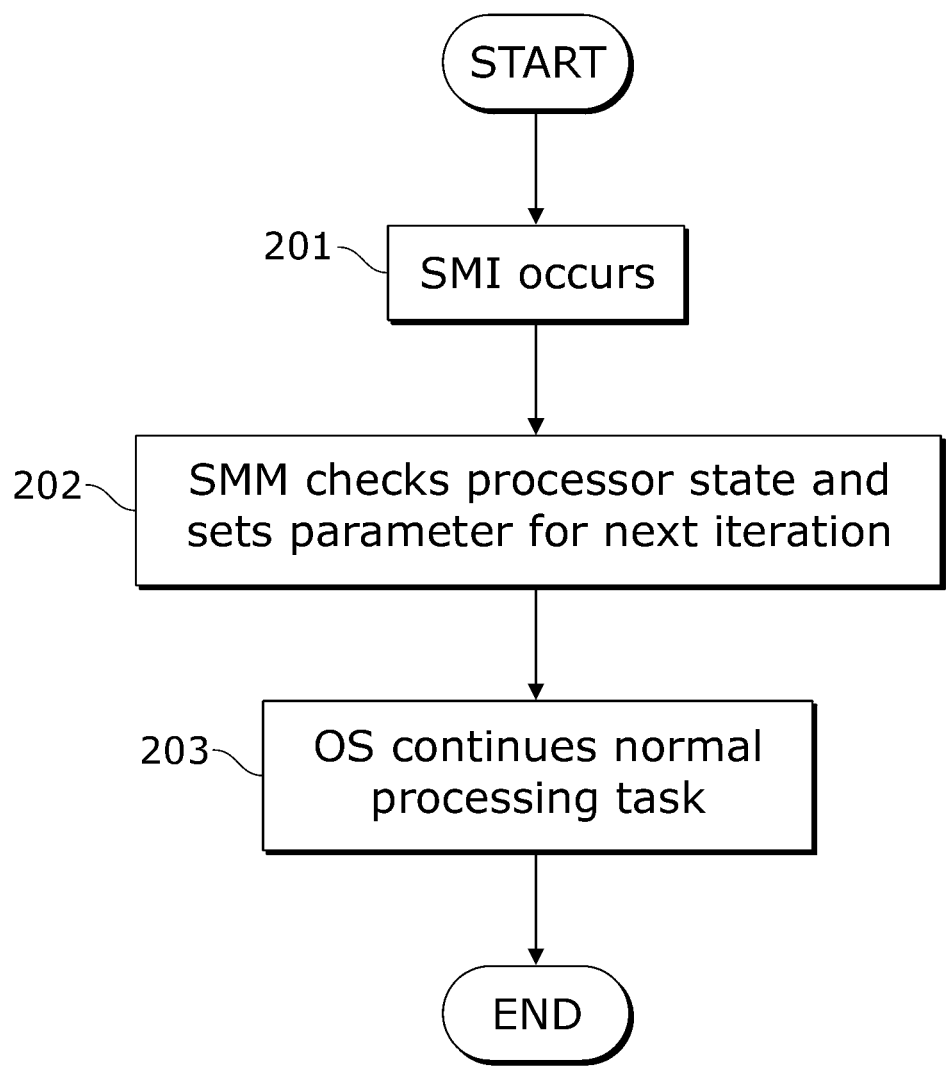
FIG. 2 represents system management mode (SMM) operations within a power management system.

FIG. 2 illustrates a system management mode (SMM) operating procedure in a conventional power management system. System Management Mode (SMM) is an operating mode in which all typical execution of applications, including the OS, is suspended and separate software (e.g., firmware, hardware-assisted debugger. etc.) may be executed in a specialized mode. During the operation of a conventional power management system, such as the Dell active power controller (DAPC) system, for example, a SMM may take over the processing function of the CPU from the OS through a system management interrupt (SMI), which may be a hardware interrupt.

As shown in FIG. 2, after an SMI 201 occurs, the processor enters into the SMM whereby the BIOS (not shown) may make an evaluation of a processor workload and establish a new set of working parameters in step 202. Examples of such working parameters may include, but are not limited to, the clock frequencies of the processor and the working voltages of the processor. Taking a fully multithreaded processor workload as an example, the BIOS may investigate the current utilization of each thread of the processor as well as the overall utilization of the processor to set a target clock frequency of the processor. The target clock frequency of the processor may be set in a manner such that the overall utilization of the processor may be increased in a subsequent iteration. Thus, the performance to power ratio may be kept at or above a satisfactory level. After adapting to new working parameters, the CPU may quit the operation under the SMM and the processor's processing function may be handed back to the OS where typical programs may continue in step 203.

In accordance with the Advanced Configuration and Power Interface (ACPI) specification, the new set of working condition parameters, such as the clock frequencies of the processor and the working voltages of the processor in step 203, may be set by exerting a target performance state (P state) of the processor which results in an optimum processing speed.

During a fully functional operating mode of a processor, the P state of the processor represents a core ratio of the processor, or in other words, the clock frequency of the processor. A processor may only work under one of several P states ranging from P0 to Pn. While P states are well recognized as implementation-dependent, P0 may be considered the highest P state which presents the highest clock frequency of the processor at which a processor can typically operate. With P0 being the highest, P1 to Pn are successively lower P states, and in some implementations, n is no greater than 16. In general, a higher processor P state or a higher clock frequency of the processor may execute more processor workloads than any successive lower processor P state or a lower clock frequency of the processor at a given period.

Typically, a better performance of the processor requires a higher clock frequency of the processor. In the meantime, a better performance may require more power consumption based on the equation, $P=CVf^2/2$, wherein C refers to a constant, P refers to power usage, V refers to a supply voltage of power source and f refers to a current clock frequency of the processor. As a result, a higher clock frequency of the processor may be expected to consume more power than a lower clock frequency of the processor. Therefore, in the improved power management algorithm, in order to achieve an optimal performance per watt ratio, a current clock frequency of the processor(s) is normally required to be reduced to a minimal level, which is just sufficient to accomplish a concurrent CPU workload on time.

The theory of turbo mode (TM) engagement for improving the performance of the processor relates to the situation where P0 is insufficient to execute a processor workload, CPU may increase the clock frequency of the processor(s) by engaging in a high performance operation mode, referred to as TM. The P state of the processor(s) when the processor(s) engage(s) in the turbo mode is generally higher than P0. The clock frequency of the processor(s) when the processor(s) engage(s) in the TM may be virtually the highest clock frequency that the processor(s) can achieve. In general, processor TM engagement, in pursuit of a higher performance of the processor, is effective and desirable in most circumstances.

However, in some instances, such as when the processor is executing a balanced fully multithreaded processor workload, performance of the processor may be enhanced at a cost of performance per power ratio. Thus, in order to avoid or minimize the cost of overall power efficiency, a processor should only be engaged in the TM when executing a balanced fully multithreaded processor workload. Therefore, a need exists for a method and/or an apparatus to supervise or manage the processor TM engagement when the processor executes a balanced fully multithreaded processor workload.

Figure 3:
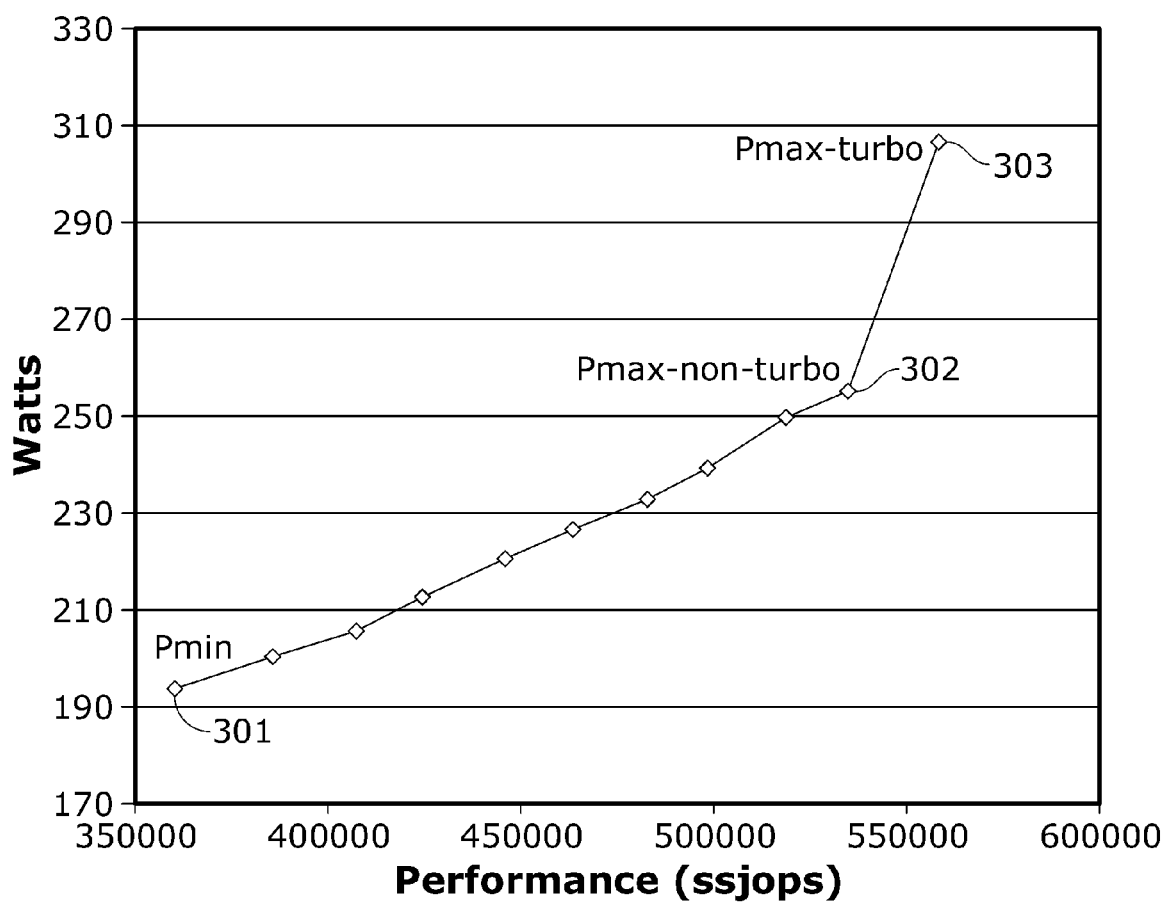
FIG. 3 provides a performance per power plot of a conventional power management system.

FIG. 3 provides a performance per power plot of a conventional power management system. The Pmin 301 may refer to a processor working point that the processor(s) operates at a minimum P state. The Pmax-non-turbo 302 may refer to a processor working point that the processor(s) operate(s) at a maximum P state without the processor(s) engaging in the turbo mode. The Pmax-turbo 303 may refer to a processor working point that the processor(s) operate(s) at a maximum P state with the processor(s) engaging in the turbo mode. As shown in FIG. 3, processor power consumption ramps up in a linear fashion along with the increase of the performance of the processor from the Pmin 301 to the Pmax-non-turbo 302. The performance per power ratio of the processor remains approximately constant in the abovementioned processor working region. Whereas, from the Pmax-non-turbo 302 to the Pmax-turbo 303, the processor power consumption significantly ramps up along with the increase of the performance of the processor. Although at the Pmax-turbo 303, the processor reaches a better performance than it does at the Pmax-non-turbo 302, the performance per power ratio of the processor at the Pmax-turbo 303 is less than it is at the Pmax-non-turbo 302. As such, the drop of the performance per power ratio of the processor when the processor(s) engage(s) in the turbo mode as mentioned earlier is clearly manifested in the power graph of FIG. 3.

Figure 4:
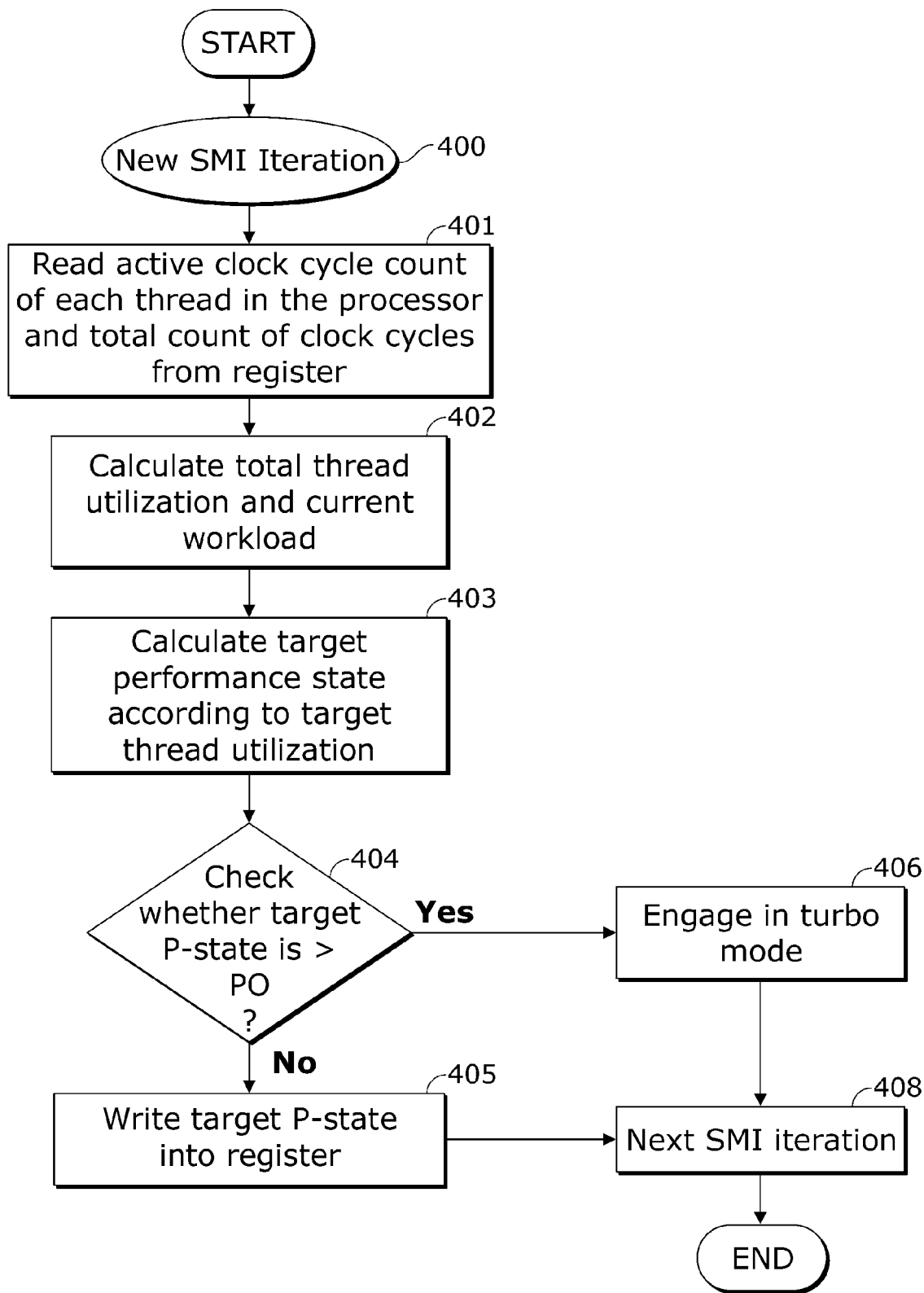
FIG. 4 provides a flowchart of the turbo mode engagement in the conventional power management system.

FIG. 4 provides a flowchart of turbo mode engagement in a conventional power management system. At the beginning of the SMI iteration in step 400, BIOS may read the count of the active clock cycles of the processor (C0_Mcnt) from a corresponding register and the total count of clock cycles of the processor (TSC) from a TSC register in step 401. Then the BIOS may calculate a current thread utilization of the processor by the equation, U=C0_Mcnt/TSC, wherein U refers to the current thread utilization of the processor in step 402. The BIOS may further calculate a current processor workload by the equation, R*U=workload, wherein R refers to the clock frequency of the processor and U refers to the utilization of the processor. Further, in step 403, the BIOS determines a target P state of the processor by the equation, Rt=(Rc*Uc)/Ut, wherein Rc refers to the current P state of the processor, Rt refers to the target P state of the processor, Uc refers to the current thread utilization of the processor and Ut refers to the target utilization of the processor. Then, it is determined in step 404 whether the target P state of the processor is greater than P0. If the target P state of the processor is less than P0, the BIOS may input the target P state of the processor in the corresponding register in step 405. Then, the processor may execute the processor workload at the latest updated target P state of the processor, which may be retrievable from the corresponding register. On the other hand, if the target P state of the processor is greater than P0, the processor may engage in the turbo mode in step 406.

When the processor is executing a balanced fully multi-threaded processor workload, performance of the processor may be enhanced but at a cost of performance per power ratio. In the conventional power management system, the utilization of the processor was only employed for calculating the processor workload but not considered as a factor in the determination of whether CPU should engage in the turbo mode in view of the performance per power ratio of the processor. In one implementation of the present disclosure, illustrated below, several threshold utilizations scenarios for the processor provide restrictions for processor TM engagement. In such way, the drop of the performance per power ratio of the processor may be effectively avoided or minimized at the higher utilization rates.

Figure 5:
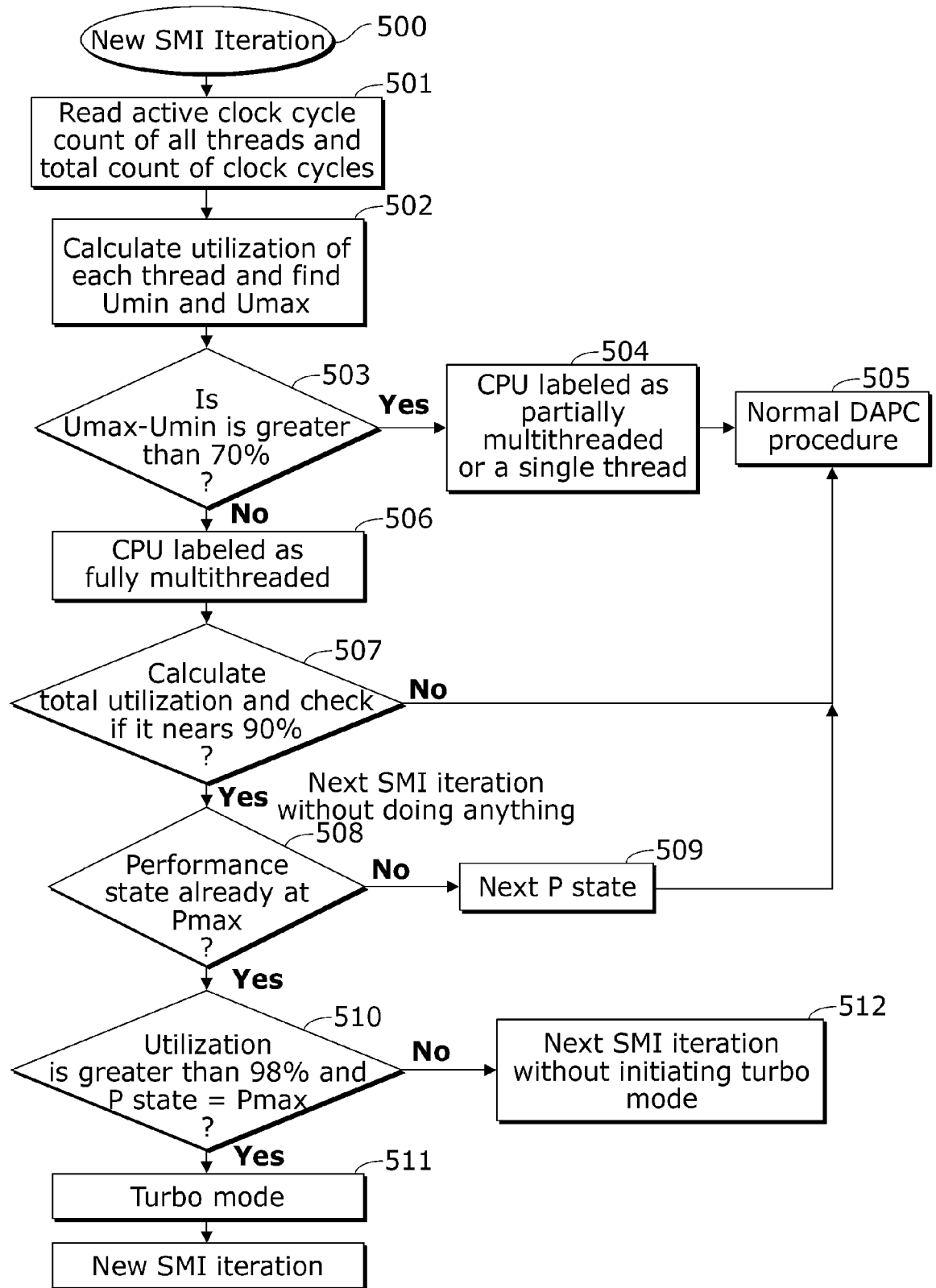
FIG. 5 provides a flowchart of method steps for the turbo mode engagement of the improved power management system in accordance with one aspect of the present disclosure.

FIG. 5 provides a flowchart of turbo mode engagement of the improved power management system in accordance with one aspect of the present disclosure. At the beginning of the SMI iteration in step 500, the BIOS may first read active clock cycle counts (e.g., C0_Mcnt) and total count of clock cycles (e.g., TSC) from the corresponding registers in step 501. In order to distinguish a fully multithreaded processor workload from a single threaded or partially multithreaded processor workload, in step 502, the BIOS may calculate the utilization of each thread of the processor as elaborated earlier. BIOS may pick one thread having the maximum utilization of the thread of the processor (Umax) and the other thread having the minimum utilization of the thread of the processor (Umin). It is further determined whether the difference between the Umin and the Umax is greater than a first threshold utilization of 70% in step 503. If the difference between the Umin and the Umax is greater than the first threshold utilization, it is indicated that one or several of all threads may have enormous idle time. As such, the processor workload is labeled as a partially multi-threaded processor workload or a single threaded processor workload in step 504. In this scenario, the processor may simply proceed with the conventional power management system algorithm in step 505.

On the other hand, if the difference between the Umin and the Umax is less than the first threshold thread utilization, it is suggested that the current processor workload is a fully multithreaded processor workload in step 506. It is further determined whether a current utilization of the processor is less than a second threshold processor utilization of 90%, which suggests a relative high utilization of the processor in step 507. If the current processor utilization is less than the second threshold processor utilization, the processor may again proceed with the conventional power management system algorithm in step 505. Then, BIOS increases the utilization of the processor in the subsequent SMI iteration and further determines whether the utilization of the processor in the next SMI iteration is less than 90%.

In the event that the current utilization of the processor is greater than the second threshold processor utilization, it is further determined whether the current P state of the processor is already at a target maximum P state (Pmax) in step 508. If the current P state has not reached Pmax, the current P state of the processor may be increased to the next P state towards Pmax in step 509. Then, the processor may proceed with the conventional power management system algorithm in step 505.

If the current P state of the processor has reached Pmax, a determination is made in the subsequent SMI iteration whether the utilization of the processor in the next SMI iteration is greater than a third threshold processor utilization of 98% in step 510. If the current utilization of the processor is greater than the third threshold utilization of the processor while the P state of the processor is still at Pmax, the processor may attempt to engage in the turbo mode in step 511. If the current utilization of the processor is less than the third threshold processor utilization, the processor may not engage in the turbo mode in step 512. In this situation of TM engagement, it is further determined in the next SMI iteration whether the concurrent utilization of the processor is greater than the third threshold processor utilization and the concurrent P state of the processor is at the Pmax, i.e., are the conditions for TM engagement still satisfied.

Figure 6:
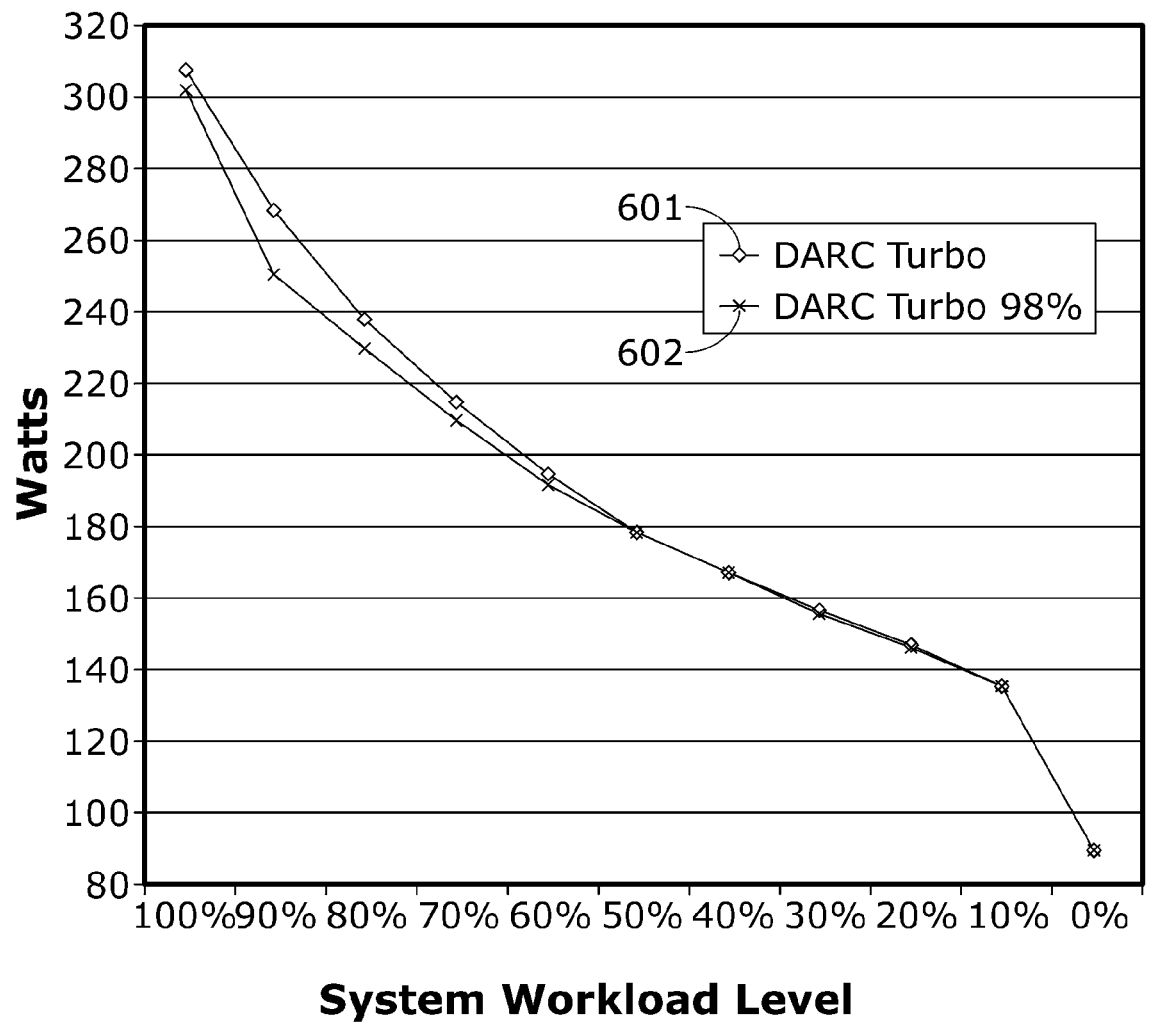
FIG. 6 provides a performance per power plot of the improved power management system in accordance with one aspect of the present disclosure.

FIG. 6 provides a performance per power comparison plot of the conventional power management system algorithm and the improved power management system algorithm. The DAPC-turbo line 601 illustrates the relationships between the performance of the processor and the power consumed by the processor in the conventional power management system. The DAPC-turbo-98% line 602 illustrates a relationship between the performance of the processor and the power consumed by the processor in an improved power management system illustrated by the present disclosure. In accordance with aspects of the present disclosure, the modification of power management system algorithm may not affect the behavior of the power management system when the processor workload level of the processor appears low. As a result, the lines 602 and 601 overlap when the workload level of the processor is low. However, when the processor workload level ramps up to a certain point, line 602 begins to manifest a higher performance per power ratio of the processor than the line 601.

In view of above, by supervising processor turbo mode engagement during the high workload operations of the processor, the improved power management system may increase the overall performance per power ratio of the processor and brings positive effects in terms of enhancing the power efficiency of the processor and the IHS.

Furthermore, methods of the present disclosure, detailed description and claims may be presented in terms of logic, software or software implemented aspects typically encoded on a variety of storage media or storage medium including, but not limited to, computer-readable storage medium/media, machine-readable storage medium/media, program storage medium/media or computer program product. Such storage media, having computer-executable instructions, may be handled, read, sensed and/or interpreted by a computer or IHS. Generally, computer-executable instructions, such as program modules, may include routines, programs, objects, components, data structures, and the like, which perform particular tasks, carry out particular methods or implement particular abstract data types. Those skilled in the art will appreciate that such storage media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. A method for managing performance and power utilization of a processor in an information handling system, comprising:
    determining, at a first time, a first maximum thread utilization (Umax1) and a first minimum thread utilization (Umin1) among a plurality of thread utilizations of a processor;
    determining whether a restriction criterion is met by determining whether a difference between Umax1 and Umin1 is greater than a threshold difference; and
    restricting engagement of a turbo mode of the processor if the restriction criterion is met.

2. The method of claim 1, further comprising determining, at a second time, a second maximum thread utilization (Umax2) and a second minimum thread utilization (Umin2) among a plurality of thread utilizations of the processor,
    wherein determining whether the restriction criterion is met further comprises determining whether a difference between Umax2 and Umin2 is greater than the threshold difference.

3. The method of claim 1, further comprising determining, at the first time, a first utilization of the processor,
    wherein determining whether the restriction criterion is met further comprises determining whether the first utilization of the processor is less than a first threshold utilization of the processor.

4. The method of claim 3, further comprising determining, at a second time, a second utilization of the processor,
    wherein determining whether the restriction criterion is met further comprises determining whether the second utilization of the processor is less than a second threshold utilization of the processor.

5. The method of claim 4, wherein the first threshold utilization is different from the second threshold utilization.

6. The method of claim 1, further comprising determining, at the first time, a first performance state (P1) of the processor,
    wherein determining whether the restriction criterion is met further comprises determining whether P1 is less than a maximum performance state (Pmax) of the processor.

7. The method of claim 6, further comprising determining, at a second time, a second performance state (P2) of the processor,
    wherein determining whether the restriction criterion is met further comprises determining whether P2 is less than Pmax.

8. A non-transitory computer readable medium comprising instructions which, when executed on a processor, cause the processor to:
    determine, at a first time, a first maximum thread utilization (Umax1) and a first minimum thread utilization (Umin2) among a plurality of thread utilizations of a processor;
    determine whether a restriction criterion is met by determining whether a difference between Umax1 and Umin1 is greater than a threshold difference; and
    restrict engagement of a turbo mode of the processor if the restriction criterion is met.

9. The non-transitory computer readable medium of claim 8, wherein:
    the instructions, when executed, further cause the processor to determine, at a second time, a second maximum thread utilization (Umax2) and a second minimum thread utilization (Umin2) among a plurality of thread utilizations of the processor; and
    determining whether the restriction criterion is met further comprises determining whether a difference between Umax2 and Umin2 is greater than the threshold difference.

10. The non-transitory computer readable medium of claim 8, wherein:
    the instructions, when executed, further cause the processor to determine, at the first time, a first utilization of the processor; and
    determining whether the restriction criterion is met further comprises determining whether the first utilization of the processor is less than a first threshold utilization of the processor.

11. The non-transitory computer readable medium of claim 10, wherein:
    the instructions, when executed, further cause the processor to determine, at a second time, a second utilization of the processor; and
    determining whether the restriction criterion is met further comprises determining whether the second utilization of the processor is less than a second threshold utilization of the processor.

12. The non-transitory computer readable medium of claim 11, wherein the first threshold utilization is different from the second threshold utilization.

13. The non-transitory computer readable medium of claim 8, wherein:
    the instructions, when executed, further cause the processor to determine, at the first time, a first performance state (P1) of the processor; and
    determining whether the restriction criterion is met further comprises determining whether P1 is less than a maximum performance state (Pmax) of the processor.

14. The non-transitory computer readable medium of claim 13, wherein:
the instructions, when executed, further cause the processor to determine, at a second time, a second performance state (P2) of the processor; and
determining whether the restriction criterion is met further comprises determining whether P2 is less than Pmax.

15. An information handling system comprising:
a processor;
a memory coupled to the processor; and
instructions contained in the memory which, when executed on the processor, cause the processor to:
determine, at a first time, a first maximum thread utilization (Umax1) and a first minimum thread utilization (Umin1) among a plurality of thread utilizations of the processor;
determine whether a restriction criterion is met by determining whether a difference between Umax1 and Umin1 is greater than a threshold difference; and
restrict engagement of a turbo mode of the processor if the restriction criterion is met.

16. The information handling system of claim 15, wherein:
the instructions, when executed, further cause the processor to determine, at a second time, a second maximum thread utilization (Umax2) and a second minimum thread utilization (Umin2) among a plurality of thread utilizations of the processor; and
determining whether the restriction criterion is met further comprises determining whether a difference between Umax2 and Umin2 is greater than the threshold difference.

17. The information handling system of claim 15, wherein:
the instructions, when executed, further cause the processor to determine, at the first time, a first utilization of the processor: and
determining whether the restriction criterion is met further comprises determining whether the first utilization of the processor is less than a first threshold utilization of the processor.

18. The information handling system of claim 17, wherein:
the instructions, when executed, further cause the processor to determine, at a second time, a second utilization of the processor; and
determining whether the restriction criterion is met further comprises determining whether the second utilization of the processor is less than a second threshold utilization of the processor.

19. The information handling system of claim 15, wherein:
the instructions, when executed, further cause the processor to determine, at the first time, a first performance state (P1) of the processor; and
determining whether the restriction criterion is met further comprises determining whether P1 is less than a maximum performance state (Pmax) of the processor.

20. The information handling system of claim 19, wherein the instructions, when executed, further cause the processor to determine, at a second time, a second performance state (P2) of the processor, wherein determining whether the restriction criterion is met further comprises determining whether P2 is less than Pmax.

* * * * *